United States Patent
Winer et al.

[11] Patent Number: 6,073,408
[45] Date of Patent: Jun. 13, 2000

[54] REVERSIBLE DECORATIVE TILE AND METHOD OF FINISHING SAME IN SITU

[75] Inventors: David A. Winer, Shelburne; Gerald A. McDermott; Edward F. Germon, both of Stowe, all of Vt.

[73] Assignee: Jeda/America, Inc., Stowe, Vt.

[21] Appl. No.: 09/359,872

[22] Filed: Jul. 27, 1999

Related U.S. Application Data

[62] Division of application No. 08/933,241, Sep. 19, 1997, Pat. No. 5,937,612.
[60] Provisional application No. 60/026,421, Sep. 20, 1996.

[51] Int. Cl.$^7$ .................................................. E04F 13/08
[52] U.S. Cl. ........................ 52/385; 52/384; 52/390; 52/747.11; 52/392
[58] Field of Search ........................ 52/384, 385, 390, 52/747.11, 386, 391, 392, 387, 388, 389

[56] References Cited

U.S. PATENT DOCUMENTS

| | | |
|---|---|---|
| 215,849 | 5/1879 | Wellington . |
| 681,946 | 9/1901 | Bennett . |
| 1,218,622 | 3/1917 | Boving . |
| 1,989,702 | 5/1935 | Leguillon . |
| 2,101,612 | 12/1937 | Duffy ........................................ 52/386 |
| 2,836,055 | 5/1958 | Shuman .................................... 52/392 |
| 2,852,932 | 9/1958 | Cable . |
| 2,887,867 | 5/1959 | Burchenal et al. . |
| 2,904,990 | 9/1959 | Emmerling ............................... 52/392 |
| 2,908,049 | 10/1959 | Gold . |
| 3,167,882 | 2/1965 | Abbott . |
| 3,294,608 | 12/1966 | Peterson . |
| 3,344,011 | 9/1967 | Goozner . |
| 3,520,095 | 7/1970 | Jonason et al. . |
| 3,806,400 | 4/1974 | Laethem . |
| 3,878,030 | 4/1975 | Cook . |
| 3,915,775 | 10/1975 | Davis . |
| 3,988,187 | 10/1976 | Witt et al. ............................. 52/747.11 |
| 4,095,388 | 6/1978 | Breault ................................. 52/747.11 |
| 4,126,500 | 11/1978 | Palanos . |
| 4,189,887 | 2/1980 | Gallant et al. . |
| 4,561,232 | 12/1985 | Gladden, Jr. et al. ..................... 52/386 |
| 4,744,194 | 5/1988 | Yasuyoshi ............................. 52/747.11 |
| 4,862,668 | 9/1989 | DeGooyer ................................. 52/390 |
| 5,043,033 | 8/1991 | Fyfe . |
| 5,238,721 | 8/1993 | Nakazawa . |
| 5,362,560 | 11/1994 | Ehrhart et al. ........................... 52/387 |
| 5,447,593 | 9/1995 | Tanaka et al. . |
| 5,474,631 | 12/1995 | Bowman . |
| 5,916,102 | 6/1999 | Peyton ..................................... 52/385 |
| 5,937,612 | 8/1999 | Winer et al. ............................. 52/385 |

OTHER PUBLICATIONS

Brochure, Merle B. Smith Co., Inc., Spring 1995.

*Primary Examiner*—Carl D. Friedman
*Assistant Examiner*—Dennis L. Dorsey
*Attorney, Agent, or Firm*—Lerner, David, Littenberg, Krumholz & Mentlik, LLP

[57] ABSTRACT

In a method for installing tiles on a substrate, tiles, having a first surface and a second, machinable surface, are arranged in installed locations on the substrate with the second, machinable surface facing away from the substrate. The machinable surfaces are then machined to reduce tile-to-tile irregularities and adjust for the variations in the subfloor, and the tiles are turned over so that the first surfaces face away from the substrate. A decorative flooring unit is also provided having a tile with a shim layer on its underside, an edge member surrounding the tile and a substrate extending beneath the edge member and the tile. The tile is installed within the edge member with the shim layer facing away from the substrate. The tile may be reversed after sanding the edge member and shim layer.

9 Claims, 7 Drawing Sheets

REVERSIBLE DECORATIVE TILE AND METHOD OF FINISHING SAME IN SITU

This application is a divisional application of application Ser. No. 08/933,241, filed Sep. 19, 1997, now U.S. Pat. No. 5,937,612. Application Ser. No. 08/933,241 and the present application both claim the benefit of U.S. Provisional Application No. 60/026,421 filed Sep. 20, 1996.

BACKGROUND OF THE INVENTION

The present invention relates to the construction and installation of tiles, especially decorative floor, wall and ceiling tiles. Specifically, the invention relates to a reversible tile and a method of finishing the tile after installation on a surface.

Hardwood is a standard material used in the construction of modern flooring. Standard hardwood floor construction comprises strips of hardwood fixed sequentially to the floor. The strips typically interlock with each other and are attached to the subfloor using fasteners and/or adhesive. After the subfloor is covered with hardwood strips, the top surface of the strips is sanded. The sanding serves two purposes: first, to improve the surface finish of the wood in preparation for varnish or oil; and second, to limit the strip-to-strip differences in thickness, both for appearance and to eliminate differences in elevation of the top surface, from strip-to-strip, that may trip a person walking on the floor. Because the strips are sanded together after installation, manufacturing tolerances in strip thickness and surface finish need not be critical and the underlying floor or sub-floor need not be perfectly smooth.

Ceramic or stone tiles are also frequently used in construction of modern flooring. Such materials are difficult or impossible to finish in situ, requiring special grinding equipment. Often, no in situ machining is done and instead the thickness of each individual tile is held within a small tolerance to reduce variations in height. In addition, the tiles themselves may be designed to reduce the effect of uneven height between adjacent tiles. For example, a tile may have a chamfer around its edge to make the height transition between adjacent tiles more gradual. Grout may also be used to compensate for irregularities between adjacent tile heights.

It is further known to use tiles in conjunction with another material in forming a composite floor. For example, in U.S. Pat. No. 2,908,048, ceramic tiles are separated by a grid of sheet vinyl or the like. The tiles are placed in openings in the grid and are raised to the level of the vinyl sheet surface by a felt shim bonded to the back of each tile. No provision is made, other than the felt shim, to eliminate inequality in height between the tile and the grid.

Stone tiles have been bonded to a wood backing for purposes of processing and later mounting. In U.S. Pat. No. 3,878,030, marble pieces are bonded to a wood layer and are later subjected to grinding and polishing to form a single tile.

It is known to build flooring from units having a hardwood frame surrounding a ceramic or stone tile. The tile is backed by a sandable shim such as particle board. The flooring unit is shipped to the construction site with the tile removed and replaced by a machinable filler block. The tile is shipped separately. After installation of the tiles on the floor, the floor is finished with the filler block in place, the filler block providing support for the sanding equipment between the hardwood frames. After the sanding and finishing is complete, the filler blocks are removed and replaced with the tiles. While this technique permits finishing and refinishing of the hardwood frames without damage to the tile, it has several disadvantages. In shipment, the tiles are loose and may be damaged. Furthermore, no compensation is made for variations between the thickness of the tile and the thickness to which the frame is surfaced at various locations around the floor. Variations in heights between the tile and the frames may result in problems of appearance and/or may create tripping obstacles.

There is therefore a need for an improved floor tile that may be finished in situ, and for an improved method for the installation of floor tiles, including the finishing of the floor tiles in situ.

SUMMARY OF THE INVENTION

One aspect of the present invention provides a method for the installation of tile units on a subsurface. A plurality of tile units are first provided, each tile unit having a first surface and a second, machinable surface. The tile units are arranged in installed locations with respect to the subsurface, so that the second machinable surfaces are facing away from the subsurface. The second machinable surfaces are then machined to reduce tile-to-tile irregularities in height from the subsurface. After machining, the tile units are turned over so that the second, machinable surfaces face the subsurface and the first surfaces face away from the subsurface. In this manner, tile-to-tile irregularities in height of the first surfaces are reduced, or eliminated.

Desirably, the step of providing the tile units includes providing a tile unit that has a decorative layer bonded to a shim layer, wherein the first surface is on the decorative layer, and the second, machinable surface is the shim layer. The decorative layer may be natural stone, ceramic, wood or other ornamental and utilitarian material. The shim layer may be particle board, plywood, fiberboard or another machinable layer. Preferably, the machining step includes sanding or planing the second, machinable surfaces.

In one aspect of the method for installing tile units, a reinforcement component for reinforcing the decorative layer is first elongated or stretched, and then bonded to the decorative layer of the tile unit. The shim layer is bonded to the reinforcement component, and the elongation is then released on the reinforcement component, placing the underside of the decorative layer in compression. The tile units are then arranged, machined and turned over as noted above.

The method of the invention may include providing a plurality of edge components having front surfaces and back surfaces, and arranging those edge components in installed locations with respect to the subsurface, so that the front surfaces face away from the subsurface. In this aspect of the invention, the front surfaces of the edge components are machined together with the second, machinable surfaces of the tile units to diminish irregularities in height between the tile units and the edge components. The edge components may surround each of the tile units, so that the tile units are removably assembled within the edge component with the second, machinable surfaces of the tile units facing in the same direction as the front surfaces of the edge components. A substrate component may be disposed beneath the tile units and the edge components with the back surface of the edge component attached to the substrate. The substrate may further be offset from the edge component to provide overlapping edges that may be engaged with overlapping edges of adjacent tile units.

A removable, protective covering may be placed over the first surface of the tile unit, and may be removed after turning the tile unit over.

In another aspect of the invention, a decorative flooring unit is provided. The flooring unit has a tile with first and second surfaces, a shim layer bonded to the second surface of the tile, and an edge member having front and back surfaces and surrounding the tile and the shim layer. The tile and the shim layer are removably installed within the edge member, so that they may be removed, turned over and reinstalled in a reverse position.

Desirably, the decorative floor unit further comprises a substrate that is attached to the back surface of the edge member and extends beneath the tile and the shim layer. The substrate may be offset with respect to the edge member to form a joint for engaging an adjacent flooring unit.

The tile may be stone, ceramic, plastic, fabric or wood, and the shim may be particle board. A reinforcement component for strengthening the tile may be placed between the tile and the shim layer. The reinforcement component is prestressed in tension, bonded to the tile and released from tension, inducing compressive forces within the tile. The reinforcement component may be steel, fiberglass or other material, and may be bonded to the tile using epoxy resin. In one aspect of the invention, the decorative flooring unit may further have an electrical heating element attached to the tile, with leads attached to connectors along edges of the flooring for electrically connecting adjacent flooring units.

DETAILED DESCRIPTION OF THE PREFERRED EMBODIMENTS

Figure 1A:
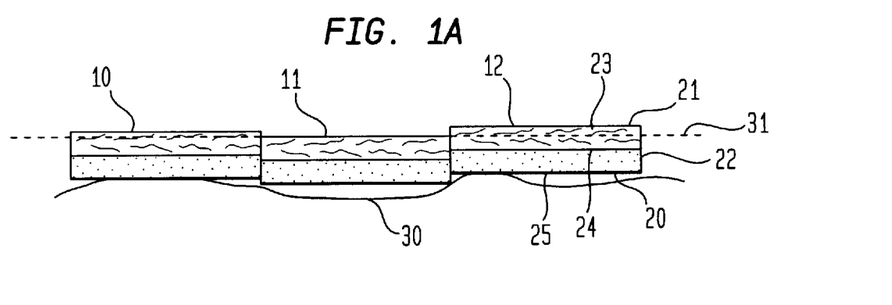
FIGS. 1a–1c are schematic sectional views of a floor in progressively later stages of installation according to the method of the invention.

The process for installing tile units on a substrate according to the invention begins by providing a plurality of tile units such as tile units 10, 11, 12 of FIG. 1a. Each tile unit has a substantially planar first surface 20, and a substantially planar second, machinable surface 21. The term "substantially planar" as used herein encompasses surfaces having irregularities, imperfections and warpage, and surfaces having features such as glue grooves and expansion grooves. The first surface 20 is generally a decorative surface that is not practical to finish or refinish in situ. In a preferred embodiment, the first surface 20 is on a decorative layer 22 of natural stone, ceramic, wood, metal, plastic, vinyl, carpeting or other material not readily machined. The second, machinable surface 21 is on a shim layer 23 of a machinable substance such as particle board, plywood, wood, plastic, medium density fiberboard (MDF), fiberboard, or other cast or laminar material. The decorative layer 22 and the shim layer 23 are bonded together at interface 24 using a suitable bonding agent such as an epoxy resin or, in certain applications, an adhesive designed for separation of the components by heating. As shipped to a construction site, the tile units 10, 11, 12 may have a protective coating 25 on the first surface 20 in order to protect that surface from damage during shipment and during the installation procedure.

The invention envisions use of a decorative layer 22 of stone, for example, where the primary faces are not smooth or not in planes which are parallel. Voids between the face of stone and the shim layer at the interface 24 can be filled with the bonding agent. The lack of parallelism may be corrected during machining of the shim layer in a complementary geometric manner. The machinable surface 21 may be machined during tile manufacture to preliminarily correct any lack of parallelism between the first surface 20 of the decorative layer and the machinable surface 21 of the shim layer. Final adjustment, in situ, is made during installation as described below.

The tile units 10, 11, 12 of FIG. 1a are arranged on a subsurface such as subfloor 30. The tiles are placed with the second, machinable surface 21 facing away from the subfloor 30, and the first surface 20, or the protective coating 25, in contact with the subfloor 30. Each of the tile units 10, 11, 12 is placed in the same position on the subfloor 30 that it will occupy after installation. As can be seen in FIG. 1a, the subfloor 30 may have irregularities and undulations that are "telegraphed" to the surfaces 21 of the individual tile units causing them to vary in height. In addition, manufacturing variations in the tile units themselves may cause similar height irregularities. For example, the decorative layer 22 of tile unit 12 is thicker than the decorative layer of the other tile units, causing the surface 21 to rise higher than the surfaces of the other tiles. Such a situation is to be expected when using natural stone that has been saw cut or ceramic tiles that may deform in firing. In addition to these factors, warpage of either the decorative layer or the shim layer may also cause variations in height of the surfaces 21.

Figure 1B:
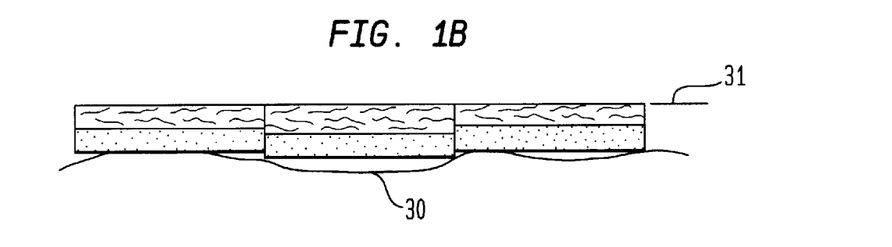

After arranging the tiles 10, 11, 12 on the subfloor 30, the second, machinable surfaces 21 are machined in order to reduce and eliminate irregularities in the heights of adjacent tiles. The machining step forms continuous surface 31, shown in FIG. 1b. The surface 31 may or may not be planar depending on the overall geometry of the underlying subfloor 30. In the case of a shim layer 23 constructed from particle board, plywood or other machinable product, the shim layers are preferably machined by sanding; however, other methods of material removal, such as grinding, planing, polishing or milling, may be used.

Figure 1C:
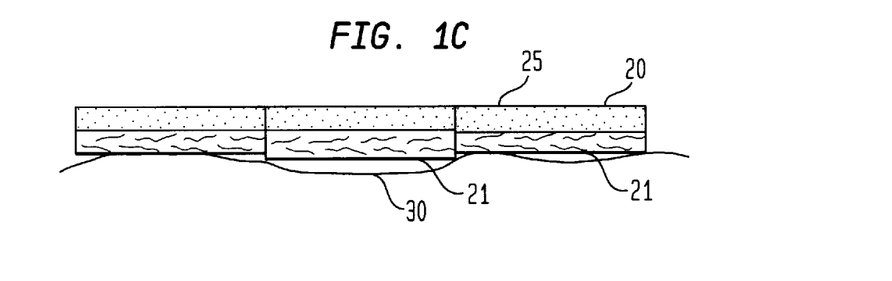

The individual tile units 10, 11, 12 are then inverted so that the second, machinable surfaces 21 face the subfloor 30 and the first surfaces 20 are exposed. Because the overall thickness of each tile from first surface 20 to second surface 21 has been adjusted by removing material from the second surface 21, the first surfaces 20 of adjacent tiles rise to the same height after turning the tiles over. The adjusted thicknesses of the tiles compensate for irregularities in the substrate 30 as well as variations in the thickness of the various tile layers. The first surfaces 20 of the tile units present a uniform surface 31, as shown in FIG. 1c. The matching of tile heights enhances the appearance of the substrate covering, and eliminates height transitions that may, in the case of flooring, present tripping hazards.

Figure 2:
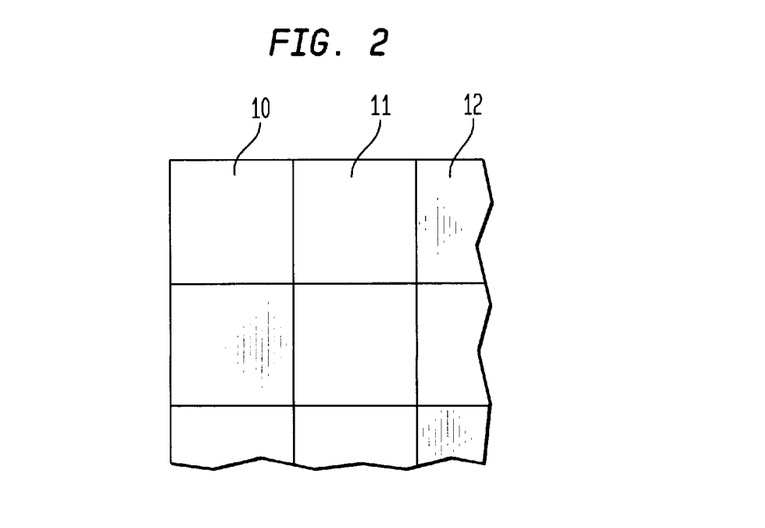
FIG. 2 is plan view of the floor of FIGS. 1a–1c after installation.

The tile units used in the method of the invention may be square tiles, as shown in plan view of FIG. 2. Alternatively, the tile units may be of other shapes that may be arranged in a pattern, such as triangles, hexagons, rectangles, circles, ellipses or combinations of these or any other shapes. The tile units may be attached to the subsurface using an adhesive, nails or fasteners, or using mechanical clips as is known in the art.

While the methods and products according to the invention are described with respect to flooring herein, it should be understood that the invention may be used in covering any subsurface such as a wall, a ceiling, furniture or outdoor decks.

Figure 3:
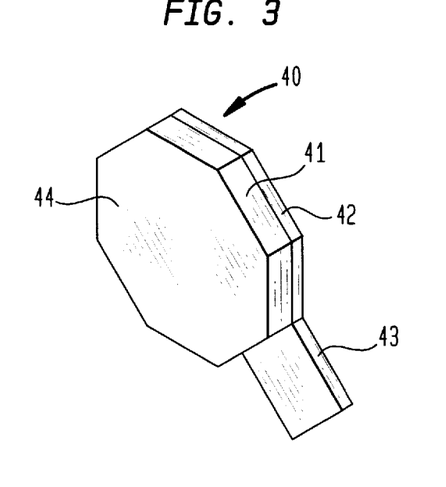
FIG. 3 is a perspective view of an edge piece according to the invention.
Figure 4:
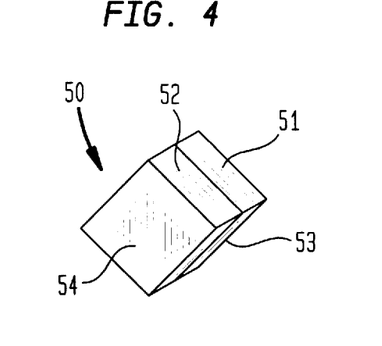
FIG. 4 is a perspective view of a tile unit for use with the edge piece of FIG. 3.

One aspect of the method of the invention includes providing a tile unit comprising an edge component 40 (FIG. 3) and a tile 50 (FIG. 4). In this embodiment, the edge component 40 has a top layer 41 and a substrate 42. The top layer has a front surface 44 that is machinable. The substrate 42 underlies the top layer 41, and in addition, has a portion 43 that extends outwardly from the top layer in the shape of the tile 50. The tile 50 has a first surface 54, and a second, machinable surface 53.

Figure 5:
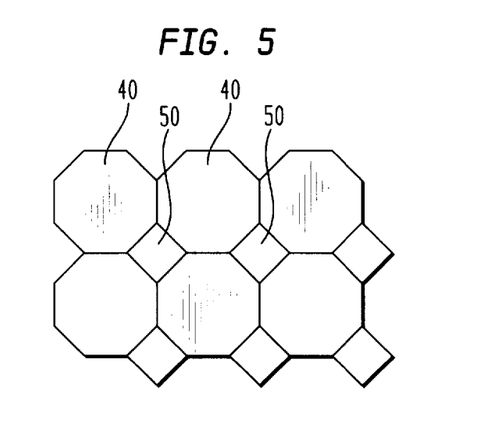
FIG. 5, is a plan view of a surface covering incorporating the edge piece of FIG. 3 and the tile of FIG. 4.

In this aspect of the invention, the edge component 40 is arranged on a subsurface with the substrate 42 contacting the subsurface and the front surface 44 facing away from the subsurface, in the position and orientation that the edge component will have in the final assembly. The substrate 43 may be slightly offset with respect to the edge component 43 to provide an overlapping joint between adjacent edge components to assist in installation and in locking tiles in place. Alternatively, the edge components may have tongue and groove joints formed on their edges. The edge component 40 may be attached to the substrate by gluing, nailing or other means. The substrate 43 provides convenient attachment points for securing the edge component, and thus, the tile to the floor. The tile 50 is arranged on the portion 43 of the substrate 42 at the location it will have in final assembly. The tile 50 is oriented with the first surface 54 facing the substrate 42 and the second, machinable surface 53 facing away from the substrate. Preferably, the tile 50 comprises a decorative layer 52, having the first surface 54, and a shim layer 51, having the second, machinable surface 53. The front surface 44 of the edge component 40, and the second, machinable surface 53 of the tile 50 therefore face away from the substrate at this point in the process. Both the edge component 40 and the tile 50 are arranged in their final locations on the substrate as shown in FIG. 5.

The edge components 40 and the tiles 50 are now machined together in their respective locations. Because the front surface 44 of the edge component 40 will be visible in the final floor assembly, machining is done not only to level the adjacent edge components and tiles, but to finish the front surfaces 44. In the case of sanding, for example, increasingly finer grits may be used. The machined surfaces may further be coated with a varnish, lacquer or other finishing substance.

After machining of the surface 44 of the edge component 40 and the surface 53 of the tile 50, the tile units 50 are removed and turned over, exposing the first surfaces 54. The tiles may be removed using a suction device such as a ventable suction cup as is used in the glazing art. The tiles may be attached to the substrate and surrounding edge components using an adhesive or clips. If it is expected that the tiles will be removed in the future, as for refinishing as described below, a thermoplastic adhesive that may be released by heating the tile may be used.

Because the tiles and edge components are machined together, individual variations in height from edge component to edge component and from edge component to tile are reduced or eliminated. The appearance of the floor is improved and trip points are reduced. A completed floor using the edge component 40 and the tile 50 is shown in FIG. 5. Other geometric configurations will be apparent to those skilled in the art.

The components may be shipped as an assembly with the tile 50 assembled on the portion 43 of the substrate. By assembling the tile 50 with the decorative layer 52 facing the portion 43 of the substrate 42, the decorative layer 52 of the tile is protected during shipment.

In a variation of this method, the edge components are provided without the substrate 42, and the tiles and edge components are placed directly on the subsurface prior to machining. In this way, the overall thickness and cost of the surface covering is reduced.

After a period of use, it is common to refinish a floor having wood components such as the edge component 40, or components of other machinable materials. Refinishing is normally done by machining the top surface of the flooring in order to remove a small amount of material. The method and surface covering of the invention facilitate such refinishing. To refinish the floor shown in FIGS. 3-5, the tile 50 may be removed and reversed so that the decorative layer 52 faces the substrate and the shim layer 51 faces upward in the same direction as the front surface 44 of the edge component 40. The tile may be removed by using a suction device such as a suction cup. Where a thermally releasable adhesive is used to retain the tile, the tile is heated before removal.

The edge component and the shim layer of the tile may thus be re-machined together, adjusting the height of the tile at the same time that the front surface 44 of the edge component is refinished. The tiles 50 are then reversed and reinstalled with the decorative layer 52 facing outward.

Figure 6:
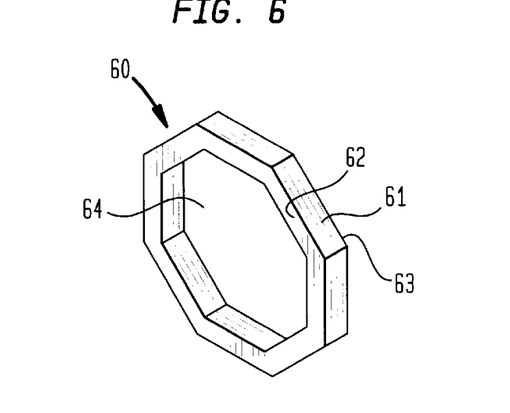
FIG. 6 is a perspective view of an edge piece according to the invention.
Figure 7:
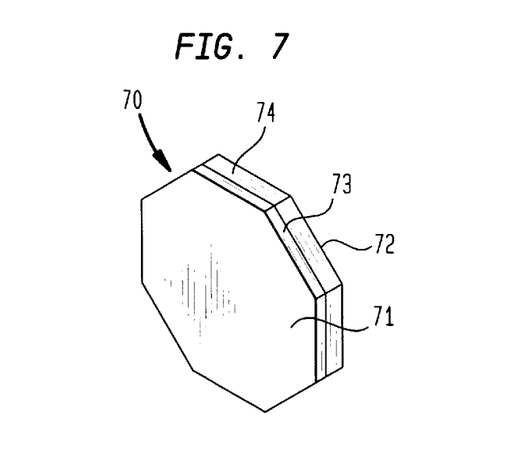
FIG. 7 is a perspective view of a tile for use with the edge piece of FIG. 6.

In another aspect of the invention, a decorative flooring unit comprises an edge component 60 (FIG. 6) and a tile 70 (FIG. 7). The edge component 60 is preferably hardwood and comprises members 61 having front surfaces 62 and rear surfaces 63. The edge component 60 further has a central opening 64 sized and shaped to receive the tile 70.

Figure 8:
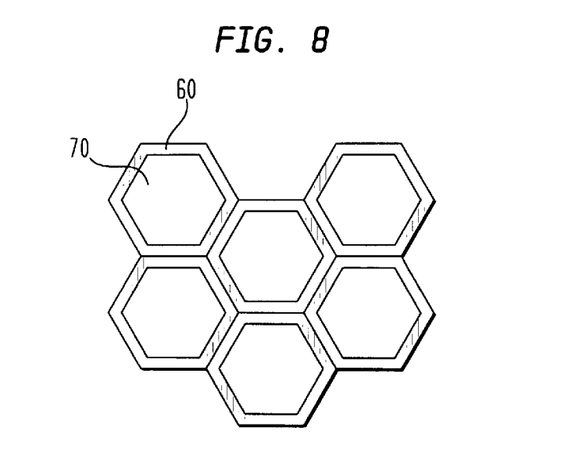
FIG. 8 is a plan view of a surface covering incorporating the edge piece of FIG. 6 and the tile of FIG. 7.

The edge component 60 has a shape that may be arranged in a repetitive pattern, such as the hexagonal shape shown in FIG. 6. Other shapes, such as squares, rectangles, or triangles, may similarly be used. A floor comprising a plurality of hexagonal-shaped tiles is shown in FIG. 8.

The tile 70 comprises a decorative layer 73 and a shim layer 74. The decorative layer 73 has a first surface 71, and the shim layer 74 has a second, machinable surface 72. The decorative layer may be grooved on the underside or otherwise produced in such a manner as to facilitate cutting in order to accommodate shortened edge components for use in spaces not fitting even multiples of the flooring unit. The edge component 60 and tile 70 may be installed using the method as described above, by arranging them on a substrate, machining the front surface 72 of the edge component 60 together with the second, machinable surface 72 of the tile 70, and then reversing the tile 70 to expose the first surface 71.

The edge component 60 and the tile 70 may be shipped as a unit with the tile 70 installed within the edge component 60. The unit is then ready to be arranged on the floor without further assembly.

Figure 9:
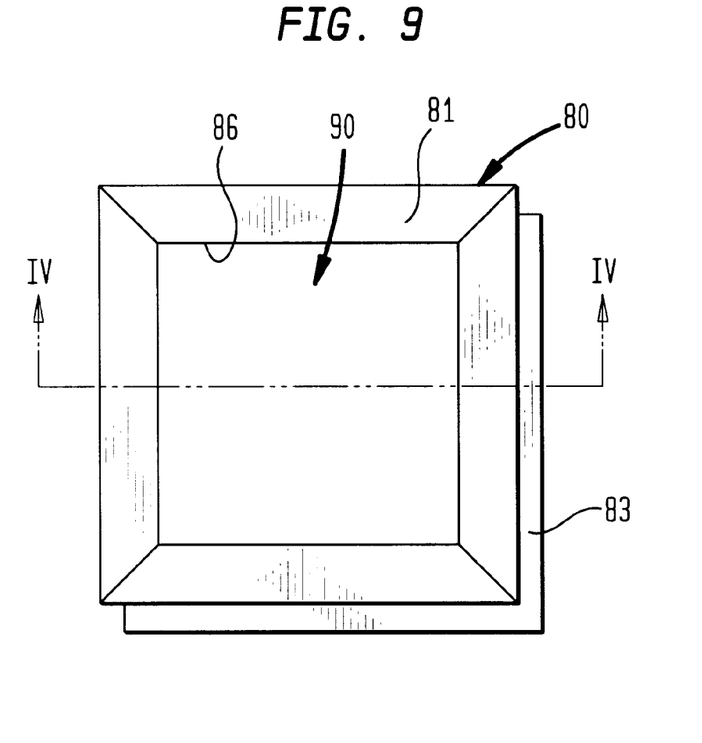
FIG. 9 is a plan view of a surface covering unit according to one embodiment of the invention.
Figure 10:
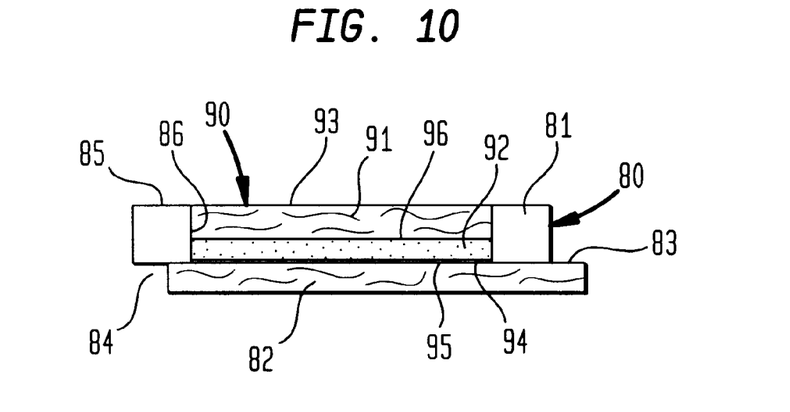
FIG. 10 is a sectional view of the surface covering unit of FIG. 9.

In another example according, to the invention, a decorative surface covering unit comprises a tile 90 surrounded by a frame 80, which is attached to a substrate 82 (FIGS. 9 & 10). While in this example the decorative surface covering unit is described with respect to a floor covering, the invention is not so limited, and may in addition be used in covering a wall, ceiling, furniture and other surfaces. The tile 90 comprises a shim layer 91 and a decorative layer 92 (FIG. 10). The layers 91, 92 are bonded together at their interface 96. The decorative layer 92 may be natural stone, and the shim layer 91 may be particle board. Although the decorative layer 92 is shown as a square, virtually any geometry may be used, including a triangle, parallelogram, circle or hexagon. The two layers may be bonded together using an epoxy resin.

A protective layer 95 is applied on a first surface 94 of the tile as a temporary barrier to abrasive damage. The protective layer may be a pressure sensitive paper or a removable plastic sheet.

The edge component 80 is a hardwood frame constructed from hardwood strips 81. The thickness of the hardwood strips is approximately equal to the overall thickness of the tiles 90, which thickness comprises the thickness of the shim layer 91, the decorative layer 92, and the protective layer 95.

The substrate 82 extends below and is attached to the hardwood strips 81 of the edge component 80. The substrate may be attached to the edge component using fasteners such as nails or screws, may be bonded using an adhesive such as an epoxy, or both. The substrate 82 is a slightly smaller size than the edge component to provide clearance for installation, and is offset from the edge component 80 in two directions. The offset forms tabs 83 on two edges of the flooring unit and forms slots 84 on the opposite two edges of the flooring unit. Adjacent flooring units are thereby interlocked as they are arranged on the subfloor. The tab 83 of the substrate 82 also provides a convenient area of the flooring unit for nailing to the subfloor. Alternatively, tongue-and-groove joints (not shown) may be formed directly in adjoining edge components 80.

The flooring unit in this example is shipped to the building site as an assembled unit as shown in FIG. 10. The tile 90 is placed within the opening 86 of the edge component 80. The decorative layer 92 faces the substrate 82, and a second, machinable surface 93 on the shim layer 91 of the tile 90 is exposed together with a front surface 85 of the edge component 80. In this way, the decorative layer 92 is completely enclosed by the wood structure of the flooring unit during shipment. The decorative layer 92 is thereby protected from point impacts, abrasive damage and bending during shipment. In the case of a natural stone decorative inlay in the flooring unit, this arrangement solves the long-standing problem of breakage during shipment before the flooring unit reaches the construction site.

The flooring unit as received at the construction site is arranged on the subfloor and finished according to the method described above. The second, machinable surface 93 of the tile 90, and the front surface 85 of the edge component 80, are sanded to a common height. The front surface 85 of the edge component 80 is concurrently given a high quality finish. The tiles 90 are then removed, inverted and reassembled into the edge component 80. Removal of material on the second, machinable surface 93 of the shim layer 91 insures that the tiles 90 and the edge components 80 will have the same height. As noted above, the tiles may be removed using a suction cup device. The tiles may be retained within the edge component either by gravity, by mechanical clip or by adhesive. In a preferred embodiment, a heat releasable adhesive is used.

The protective layer 95 applied to the first surface 94 of the tile, protects that surface from abrasive damage during shipment. In addition, the final height of the first surface 94 of the tile 90 is reduced by the thickness of the protective layer 95. This may be desirable in the case of natural stone where a sharp corner may extend along the outer edges of the exposed surface.

In one example of this embodiment, a 12×12 inch natural stone decorative layer is ⅜ inches thick, and is bonded to a ⅛ inch thick particle board shim layer. The shim layer is approximately 0.025 smaller than the decorative layer along each edge in plan view, in order to provide clearances. The edge component is ½ inch thick. Each hardwood strip comprising the edge is 2 inches wide, resulting in a 16×16 inch flooring unit. The substrate is ¼ inch plywood. The total thickness of the flooring unit is therefore ¾ inches, a standard thickness in the industry.

In addition to correcting variation in height between the tile and the edge component, the machining step also corrects errors in parallelism between the two faces of the decorative layer 92. Where natural stone such as marble or slate is used, this is important because of the manufacturing variations involved in the cutting and polishing processes.

Figure 11:
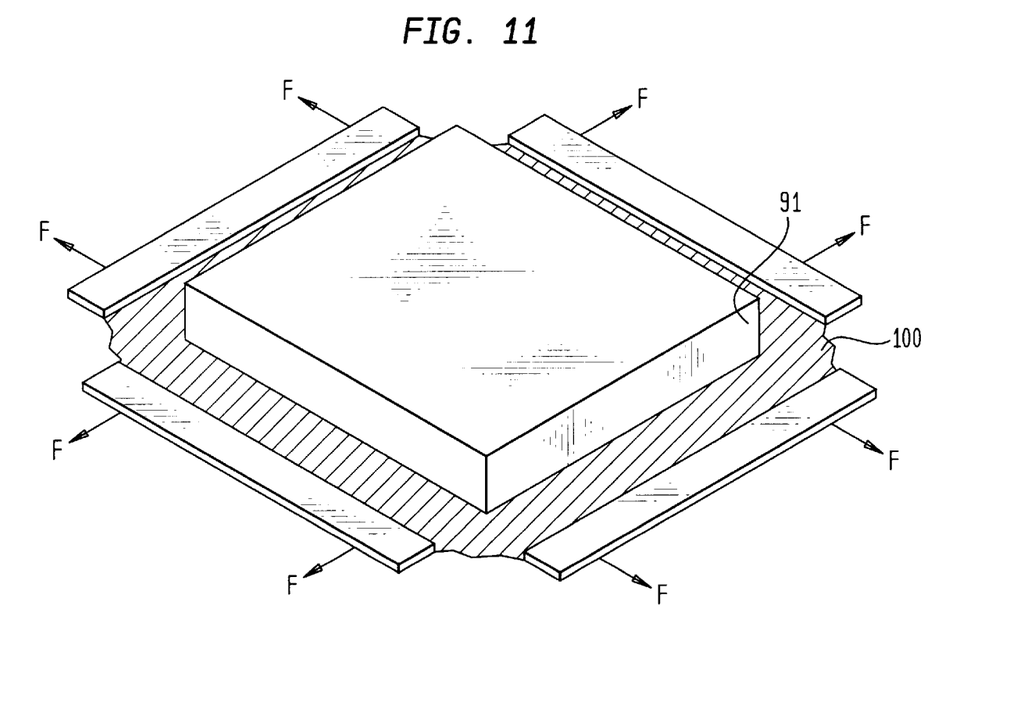
FIG. 11 is a schematic perspective view of a step of fabricating a surface covering unit according to one embodiment of the invention.
Figure 12:
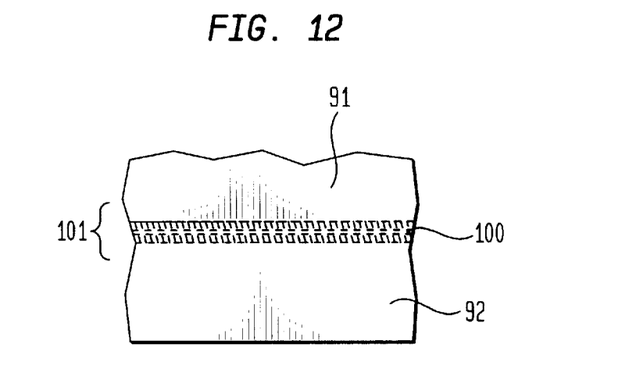
FIG. 12 is a side elevation view of a tile unit according to the invention having a reinforcement matrix.

The tile 90 may have a reinforcement component 100 (FIGS. 11, 12) at the interface 96 between the decorative layer 92 and the shim 91. The reinforcement component 100 may be used advantageously where brittle materials having high compression strength but low tensile strength are used as the decorative layer 92. For example, natural stone, ceramic, glass or terra-cotta, while having superior wear characteristics and compression strength, is easily cracked where tensile stress is induced under bending or twisting loads. Such loads may result from uneven support of decorative layer 92 due to bumps or bends in the supporting surfaces or may result from uneven loading of the top surface of the layer.

The reinforcement component is preferably a steel mesh, which has a high modulus of elasticity, and which also has geometric features that facilitate bonding to the decorative layer. Alternatively, the reinforcement component may be fiberglass, plastic such as nylons or polyesters, or may be fabricated from common fibers. Before bonding to the decorative layer 92, the reinforcement component is expanded in its primary plane. In one example, the reinforcement component is placed under mechanical forces F (FIG. 11) which elongate the reinforcement matrix in both directions of the plane evenly. The reinforcement component may alternatively be elongated in a single direction only, where reinforcement is needed in only one direction. The reinforcement component is elongated according to Young's Modulus of Elasticity for the material selected for the reinforcement component. Alternatively, the reinforcement component may be heated, whereby it will be elongated according to the thermal coefficient of expansion of the material selected for the reinforcement component. In either case, the component must be expanded sufficiently to store a quantity of strain energy required to create sufficient compressive forces in the decorative layer 92 to support service loads.

Reinforcement component 100 is then bonded to the decorative layer 92 using a suitable bonding agent such as animal glue, casein glue, soybean glue, vegetable glue, silicate of soda glue, albumin glue, urea-formaldehydes, phenol-formaldehydes, resorcinol-formaldehyde, melamine-formaldehyde, polyvinyl resin emulsions, plastic bonding agents such as Reanite (Registered), Cycleweld (Registered), Kotol (Registered), pyroxylin cement, rubber cements of the latex and solvent rubber type, magnesia cement, acrylic resin, acrylonitrile, aliphatic resin, cellulose nitrate, contact cement, cyanoacrylate ester, epoxy, hide glue-flake, hide glue-liquid, hot melt glue, latex combo, neoprene base, polyester resin, polyethylene hot melt, polysulfide, polyvinyl acetate, polyvinyl chloride (PVC), resorcinol resin, silicone base, rubber base, urea-resin glue, water phase epoxy, bone glue, fish glue, furan cement, latex pastes, pyroxylin cement or ultraviolet glue. The bonding agent should be selected so as to provide sufficient strength to transfer the strain energy from the reinforcement component to the decorative layer. This bonding process may be combined with the bonding of the shim layer 91 to the decorative layer 92. After the bonding agent 101 (FIG. 12) has cured or set, the forces on the reinforcement component are released, reversing the tensile strain energy in the reinforcement component to compressive forces acting on the decorative layer. The decorative layer will thereby withstand increased loading since induced tension forces due to service loads must first overcome the compressive forces provided by the reinforcement component located on the underside of the tile.

In another embodiment of the invention, an integral heating element placed between the substrate and the tile surface is used to heat the tile and the room in which the tile is used. The heat source may be hot water, electricity, steam or solar. The heating elements are integrally installed in each flooring unit, and the heat source is transferred throughout the room from tile to tile.

Figures 13, 13A, 13B:
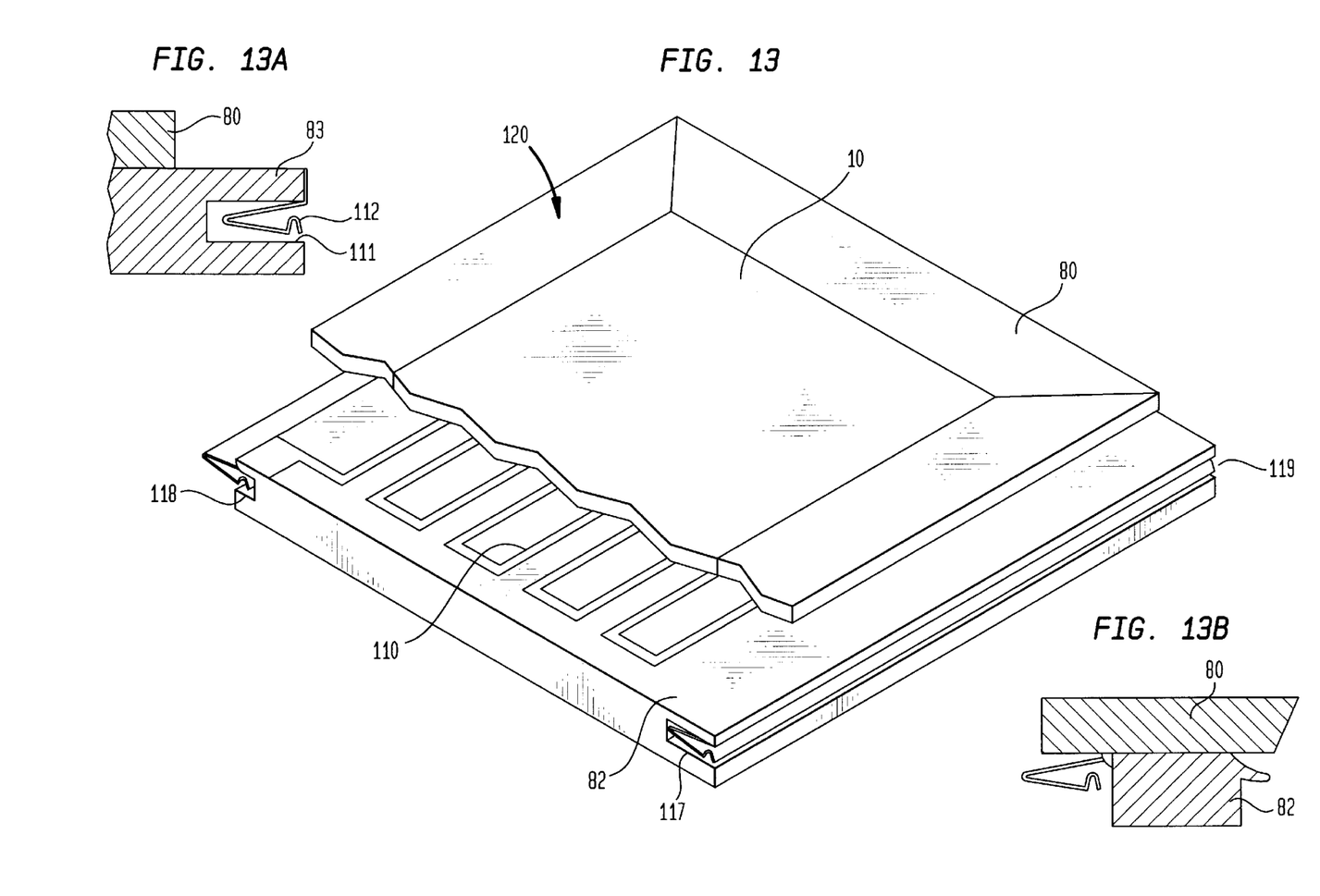
FIG. 13 is a schematic perspective view of a flooring unit according to the invention having a heating element.
FIGS. 13a, 13b are sectional views of the flooring unit of FIG. 13.
Figure 14:
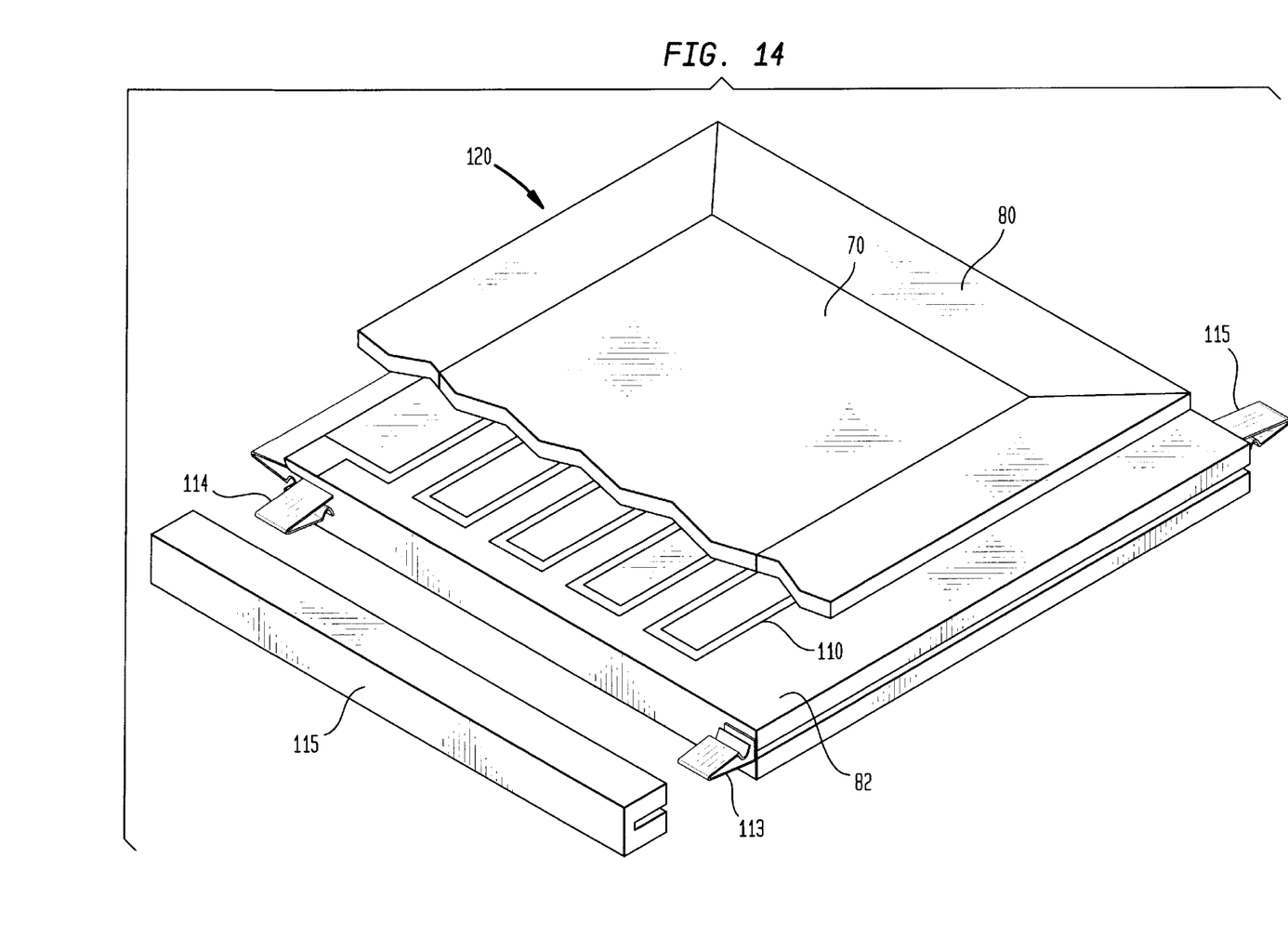
FIG. 14 is a schematic perspective view of an edge tile having heating elements.

In the case of electrical heating (FIG. 13), a heating element 110 is installed on the upper surface of the substrate 82 of field tiles 109 and starter tiles 120 (FIG. 14). The heating element 110 may underlie the tile 90, the edge component 80 or both. The heating element is electrically powered through connectors located on the edges of the tile. In the field tiles 109 (FIG. 13), a female connector 112 may be located in a slot 111 formed in the tab section 83 of the substrate 82 (FIG. 13a). Additionally, a male connector 112 may be located in the slot region 84 formed by the offset of substrate 82. As the electrically heated tiles are arranged on the floor, adjacent tiles are electrically connected through the connectors 111, 112, forming an electrical circuit.

A power bus 115 (FIG. 14) is placed on one side of an array of units; for example, along one wall of a heated floor. The starter tiles 120 have additional male connectors 113, 114 along a single edge of the tile. The connectors 113, 114 plug into the power bus 115 at any point, providing power for each starter tile 120 separately. Additionally, each field tile 109 (FIG. 13) has female connectors 117, 118 to receive power from either a starter tile 120 through connectors 115, or from an adjacent field tile through connectors 119. Thus, the starter tiles 120 and field tiles 109 are configured so that a single tile can be removed from the field without interrupting the remaining circuits operating the heating elements. Should a connection fail, only that tile which contains the circuit will cease to operate, since the remaining circuit will be closed and uninterrupted.

As these and other combinations and variations of the features discussed above can be utilized without departing from the present invention as defined by the claims, the foregoing description of the preferred embodiments should be taken as illustrating, rather than limiting, the invention as claimed.

We claim:

1. A decorative surface covering unit, comprising:

a tile unit having first and second surfaces;

a shim layer bonded to said second surface of said tile unit; and an edge member having front and back surfaces, said edge member surrounding said tile unit and said shim layer;

said tile unit and said shim layer being removably installed within said edge member whereby said tile unit and shim member may be removed, turned over and reinstalled in an inverted position.

2. The decorative surface covering unit as claimed in claim 1, further comprising a substrate attached to said back surface of said edge member and extending beneath said tile unit and shim layer.

3. The decorative surface covering unit as claimed in claim 2, wherein said substrate is offset with respect to said edge member for forming a joint for engaging an adjacent flooring unit.

4. The decorative surface covering unit as claimed in claim 1, wherein said tile unit is stone.

5. The decorative surface covering unit as claimed in claim 1, wherein said shim is particle board.

6. The decorative surface covering unit as claimed in claim 1, further comprising a reinforcement component for reinforcing said tile unit, said reinforcement component being elongated, bonded to said tile unit, and released from elongation thereby inducing compressive forces within said tile unit.

7. The decorative surface covering unit as claimed in claim 6, wherein said reinforcement component is steel.

8. The decorative surface covering unit as claimed in claim 6, wherein said reinforcement component is bonded to said tile unit using an epoxy resin.

9. The decorative surface covering unit as claimed in claim 1, further comprising an electrical heating element attached to said tile unit, said heating element having leads attached to connectors along edges of said flooring unit for electrically connecting adjacent flooring units.

* * * * *